Patented June 24, 1941

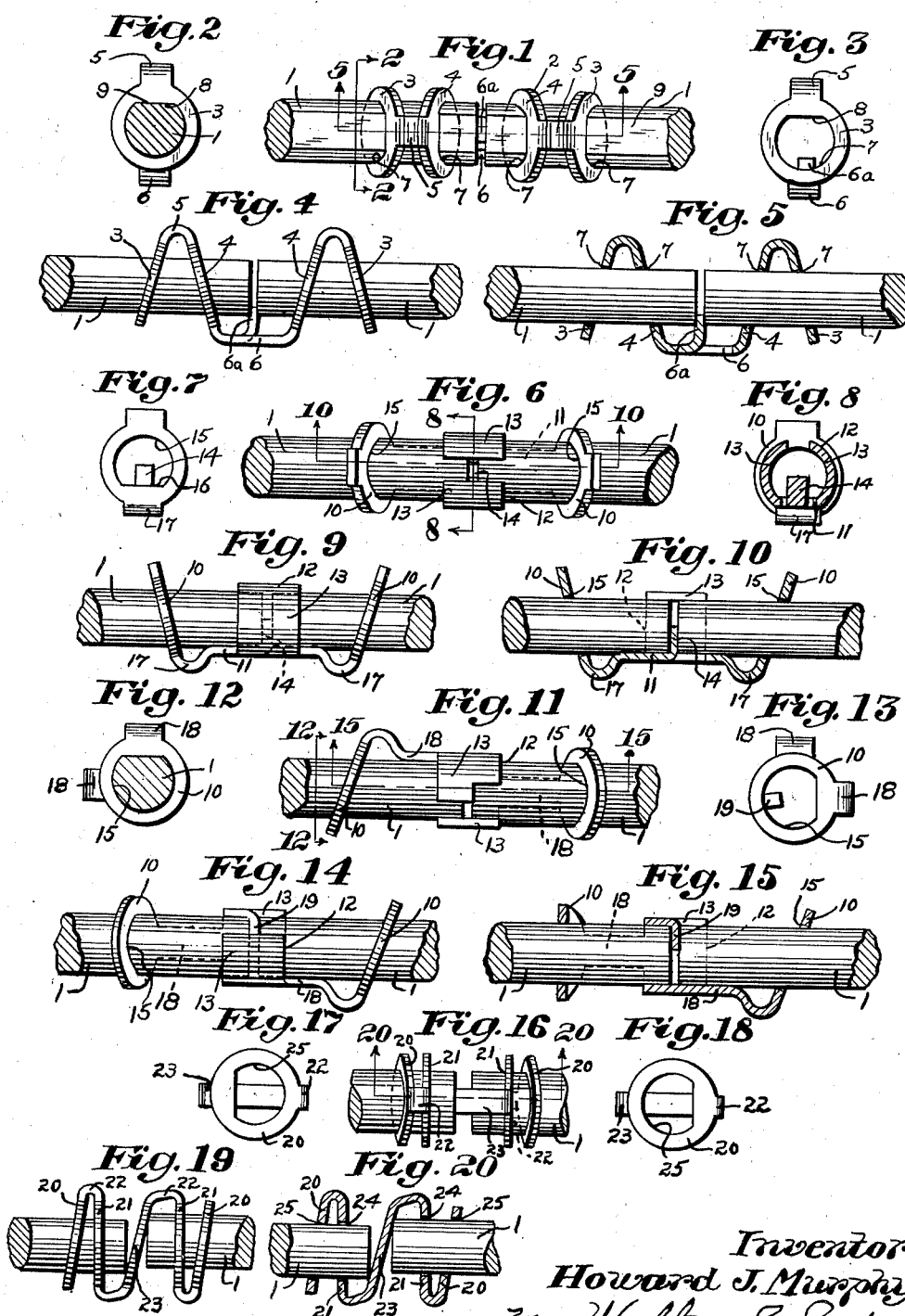

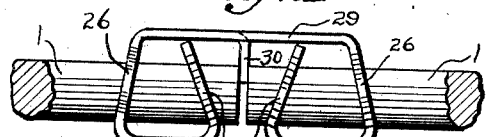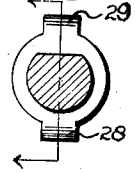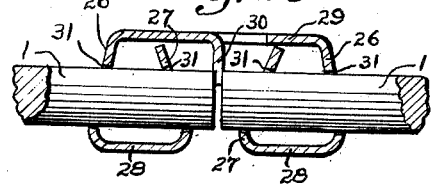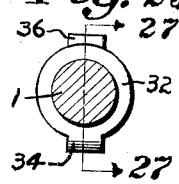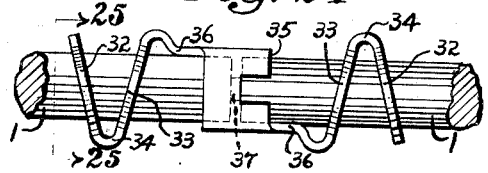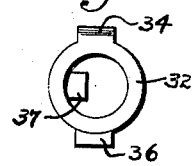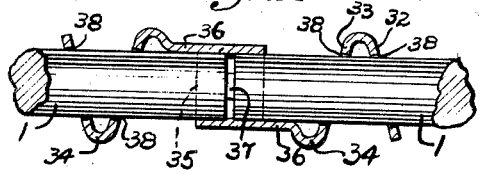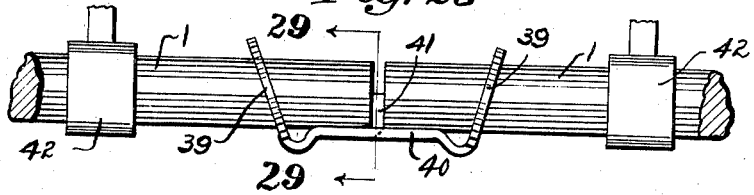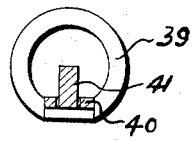

2,246,750

UNITED STATES PATENT OFFICE 2,246,750

COUPLING AND COUPLING INSTALLATION

Howard J. Murphy, Greenwood, Mass., assignor to United-Carr Fastener Corporation, Cambridge, Mass., a corporation of Massachusetts Application June 12, 1937, Serial No. 147,957

8 Claims. (Cl. 64—15)

My invention relates to spring couplings for securing together a pair of rod-like members and installations of the same.

Referring to the drawings, in which I have illustrated preferred embodiments of my invention:

Figure 1 is a plan view of an installation showing a pair of rods secured together by means of my first form of spring coupling;

Fig. 2 is a section taken along the line 2—2 of Fig. 1;

Fig. 3 is an end view of the spring coupling shown in Fig. 1 with the rod members omitted;

Fig. 4 is a side view of the installation shown in Fig. 1;

Fig. 5 is a section taken along the line 5—5 of Fig. 1;

Fig. 6 is a plan view of an installation showing a pair of rod members secured together by means of my second form of spring coupling;

Fig. 7 is an end view of the fastener member shown in Fig. 6 with the rod members omitted;

Fig. 8 is a section taken along the line 8—8 of Fig. 6;

Fig. 9 is a side view of the installation shown in Fig. 6;

Fig. 10 is a section taken along the line 10—10 of Fig. 6;

Fig. 11 is a plan view of an installation showing a pair of rod members secured together by means of my third form of spring coupling;

Fig. 12 is a section taken along the line 12—12 of Fig. 11;

Fig. 13 is an end view of the spring coupling shown in Fig. 11 with the rod members omitted;

Fig. 14 is a view similar to that of Fig. 11 but with the installation turned substantially 45°;

Fig. 15 is a section taken along the line 15—15 of Fig. 11;

Fig. 16 is a plan view of an installation showing a pair of rod members secured together by means of my fourth form of spring coupling;

Fig. 17 is an end view of the spring coupling without the rod members looking from the left of Fig. 16;

Fig. 18 is an end view of the spring coupling without the rod members looking from the right of Fig. 16;

Fig. 19 is a side view of the installation shown in Fig. 16;

Fig. 20 is a section taken along the line 20—20 of Fig. 16;

Fig. 21 is a side elevation of an installation showing a pair of rod members secured together by means of my fifth form of spring coupling;

Fig. 22 is an end view of the installation shown in Fig. 21;

Fig. 23 is a section taken along the line 23—23 of Fig. 22;

Fig. 24 is a side elevation of an installation showing a pair of rod members secured together by means of my sixth form of spring coupling;

Fig. 25 is an end view of the installation shown in Fig. 24 looking from the left;

Fig. 26 is an end view of the spring coupling without the rod members looking from the right of the installation shown in Fig. 24;

Fig. 27 is a section taken along the line 27—27 of Fig. 25;

Fig. 28 is a side elevation of an installation showing a pair of rod members secured together by means of my seventh form of spring coupling with the rod members supported in position to be gripped by the coupling by a means independent of the coupling device; and Fig. 29 is a section taken along the line 29—29 of Fig. 28 with the rod supporting means omitted.

The chief object of my invention is the provision of simple spring couplings constructed in a way to enable a pair of rod-like members, such as may be used for control rods in the manufacture of automobiles, radios and other mechanical apparatus, to be separably coupled together. Each form of spring coupling illustrated and described in my present application comprises broadly a connecting device having at least one spring arm at each end provided with an aperture through which one of the rods extends with the arms disposed in an inclined position for gripping the respective rods by a canting action.

In the preferred forms of my invention hereinafter set forth, I have provided a stop means intermediate the ends of the coupling device for limiting passage of the free ends of the rods through the arms, as will be hereinafter described. Furthermore, several of the forms of my spring coupling herein presented provide means as a part of themselves cooperating with the spring arms for maintaining the rods in position to be gripped by the arms, but I do not wish to limit those forms to that particular construction, as it will be understood from an inspection of the drawings and specification that the rod members may be supported in position for said gripping action by some means independent of the couplings per se.

It will be apparent from an inspection of several of the forms of my invention hereinafter described that the rod members and the coupling have means for preventing relative rotation of the parts with the result that my coupling is particularly useful for purposes such as connecting parts of apparatus with a remotely disposed control knob whereby rotary movement applied to one of the rod members through the control knob serves to rotate the other of the rod members for actuating parts of the apparatus.

Referring to the preferred forms of my installations illustrated in the drawings, I have shown a pair of rod-like members 1—1 leading from substantially opposite points and separably coupled together at their ends by means of a one-piece spring coupling 2.

My first form of spring coupling illustrated in Figs. 1-5 of the drawings has a pair of spring arms 3 and 4 at each end with the arms of each pair joined together at their ends by a portion 5. The pairs of arms are maintained in spaced coupled relation through means of a connecting portion 6 integral with an opposite end of the inner arm 4 of each pair from that connected to the outer arm 3. A lug portion 6ᵃ may be struck up from a connecting portion 6 (Fig. 5) for limiting movement of the rods 1—1 through the arms in a manner which will be described. Each of the arms 3 and 4 has an aperture 7 for receiving an end of one of the rods 1 during coupling thereof. The aperture 7, in my preferred form, has a flat side 8 (Figs. 2 and 3) for cooperating with a flat side 9 of the rods 1—1 (Figs. 1 and 2) for preventing relative rotation of the parts. It is understood, however, that I do not wish to be limited by this particular shape of the apertures in the arms of this form of coupling or any other form of coupling which falls within the scope and spirit of my present invention as my coupling devices are capable of efficiently coupling a pair of rods, even though the apertures be round or some other shape, for cooperating with rod-like members of similar cross-sectional shape. When my first form of coupling is inactive, the arms 3 and 4 of each pair are in inclined relation relative to each other with the apertures 7 of the arms of each pair slightly out of alignment.

Attachment of the rods 1—1 through means of my first form of spring coupling is illustrative of the general way in which rod members may be connected by other forms of spring couplings which fall within the scope of my present invention and is carried out in a relatively easy manner through extending an end of one of the rods 1—1 through the apertures 7 of each of the respective pairs of spring arms. During passage of an end of a rod through the spring arms of each of the pairs, the pressure of the rod causes the spring arms to contract whereby the apertures 7 of each of the pairs are brought into alignment permitting passage of the rod 1 through the arms until the outermost end of the rod abuts the stop means 6ᵃ. When pressure on the rod 1 for moving it through a pair of arms is relaxed the resilient tendency of the device causes the arms 3 and 4 of each pair to separate whereby the material of the arms of each pair adjacent the aperture engages the respective rod member in a spring grip. The rods 1—1 are now securely coupled together and as a result of the cooperating means provided by the parts for preventing relative rotation, a rotary action applied to one of the rods is transmitted to the other of the rods. To detach the rod members from the coupling it is necessary simply to move the free ends of the outer arms 3 of each pair toward each other until the apertures 7 of the arms of each pair are in substantial alignment whereupon the rods may be readily removed from the arms. It is important to notice in connection with my first form of coupling that the arms of each pair cooperate to maintain the rod members in proper position whereby the arms may grip the rods.

Referring to my second form of spring coupling illustrated in Figs. 6-10, I have provided a one-piece device having a single spring arm 10 at each end with the arms maintained in spaced coupled relation by means of a substantially straight connecting portion 11. Intermediate the arms 10—10 I have provided a hollow bearing 12 which is formed by bending side portions 13 integral with opposite edges of the connecting portion 11 into a cylindrical form with a longitudinal space between the meeting edges (Figs. 6 and 8). The bearing 12 is adapted to partly encircle and support respective ends of the rods 1—1 for maintaining the rods in proper position to be gripped by the spring arms 10—10. A stop means in the form of a lug 14 is preferably struck up from the connecting portion 11 between opposed side portions 13—13 serving to limit movement of the rods 1—1 through the respective spring arms 10 in the manner of the stop means 6ᵃ of the first form of my invention. Each of the arms 10—10 is normally in inclined position and has an aperture 15 which is adapted to receive one of the rods 1—1. Each of the apertures 15, in my preferred form, has a flat side 16 (Fig. 7) for cooperating with a flat side of a rod of similar cross-sectional shape for preventing relative rotation of the parts. The respective apertures 15 of the arms 10—10 are slightly out of alignment with the axial opening of the bearing 12 when the coupling device is inactive so that the arms may be contracted when ends of the respective rods 1—1 are extended through the apertures 15 into the axial opening of the bearing 12. The material of the connecting portion 11 may be bent downwardly out of the normal plane thereof at points 17 (Figs. 9 and 10) adjacent the junction of the arms 10—10 with the connecting portion so as to increase flexibility of the arms 10—10 for enabling the rods to be engaged with and disengaged from the spring coupling in an easier manner.

Attachment of the rods 1—1 through means of my second form of spring coupling is carried out by extending the ends of the rods 1—1 through respective arms 10 until the free ends of the rods abut the stop means 14 (Fig. 10). When the rods 1—1 are in this position, their free ends are supported by the bearing 12 and the arms 10 grip the rods in a canting action, as most clearly shown in Fig. 10.

My third form of spring coupling illustrated in Figs. 11-15 is broadly similar to my second form hereinabove described but modified slightly so as to be capable of coupling rods which may be laterally out of alignment. It will be noticed that the inclined spring arms 10—10 at opposed ends of my third form are connected to the bearing 12 by means of connecting portions 18 which are joined to the bearing 12 in offset relation rather than in substantially a straight line in the manner of the portions of the connecting portion 11 of my second form of coupling extending from opposed ends of the bearing 12. As a result of the fact that the natural resiliency of the coupling enables the portions 18 to yield slightly in their vertical planes, it is possible with my third form of coupling to attach together two rods, which may be slightly out of alignment laterally, one with another. My third form of coupling may be further differentiated from my second form through the fact that it has a stop means in the form of a lug 19 which is bent out of a side portion 13 of the bearing 12 adjacent a meeting edge of the side portion, as most clearly shown in Figs. 14 and 15. Coupling of the rods 1—1 together through means of my third form of coupling device is carried out through inserting the free ends of the rods through apertures 15 of the respective arms 10 until outermost free ends abut the stop lug 19 whereupon the spring arms grip the rods in a canting action to secure them to the coupling in a manner similar to that by which rods are secured by my second form of coupling hereinabove described.

My fourth form of coupling illustrated in Figs. 16–20 of the drawings has a pair of arms 20 and 21 at each end with the arms of each pair joined at their ends by a portion 22. Each pair of arms is in inverted position relative to the other, as most clearly shown in Figs. 19 and 20. It is important to notice with this form of coupling that the outer arm 20 of each pair is normally inclined for canting with one of the rods 1—1 to be coupled together and the inner arm 21 is disposed in substantially vertical relation to a rod to be extended therethrough whereby the arms 21 act as bearings to maintain the respective rod members in proper position to be gripped by the inclined arms 20 which are naturally yieldable relative to the respective arm 21 to which they are joined. Each pair of arms is maintained in spaced coupled relation through means of a connecting portion 23 which, as most clearly illustrated in Figs. 19 and 20, is integral with a free end of the inner arm 21 of each of the inverted pairs opposed to its end joined to the outer arm 20. As a result of this construction, the portion 23 is in alignment with a rod-receiving aperture 24 (Fig. 20) of each of the inner arms 21 so as to act as a stop means for limiting passage of the rod members 1 through the respective arms 21. The inclined arm 20 of each pair of arms has an aperture 25 which is out of alignment with the aperture 24 of the cooperating arm 21 when the arms are in inactive position. In coupling the rods together through means of my fourth form of fastener, the free ends of the rods are inserted through the apertures 25 and 24 of the respective pairs until their outermost free ends abut the connecting portion 23, at which time the arms 20, which have been contracted during passage of the rods therethrough, expand to grip the rods in a canting action.

In Figs. 21 through 23 I have shown a fifth form of spring coupling having a pair of spring arms 26 and 27 at each end joined together by a relatively straight portion 28. The arms 26 and 27 of each pair in this form of coupling converge from their ends joined to the portion 28, as shown in Figs. 21 and 23, whereby the arms assume an inclined position. Each pair of arms is maintained in spaced coupled relation by a connecting portion 29 integral with an end of an outer arm 26 of each pair opposed to an end joined to the portion 28. The connecting portion 29 is substantially parallel to the connecting portions 28, as shown in Figs. 21 and 23. A stop means may be provided in the form of a lug 30 struck up from the connecting portion 29 for limiting passage of the rod members 1—1 through the respective arms in the manner of the stop lugs in the other forms of my invention hereinabove described. The arms of each pair have an aperture 31 therein with the aperture 31 of the outer arm 26 slightly out of alignment with the aperture 31 of the inner arm 27 when the coupling is inactive. Coupling the rods 1—1 by means of my fifth form of coupling device, a rod member is extended through the aperture of each of the respective pairs of spring arms until its outermost free end abuts the stop lug 30. This movement of the rod member through the respective pairs of arms causes the inner arm 27 of each pair to move away from the outer arm 26 thereby aligning the apertures 31 of the arms of the respective pairs to enable the free ends of the rods to pass therethrough whereupon the arms contract through the natural resiliency of the same to grip the rod members.

In Figs. 24–27 I have shown a sixth form of my spring coupling having a pair of spring arms 32 and 33 at each end. The arms are joined at their free ends by a portion 34 and each of the arms is in inverted relation to the other. Each pair of arms is connected together by a connecting portion which comprises a substantially cylindrical bearing 35 having integral portions 36 extending from opposite ends of the bearing 35 to the opposite ends of the respective inner spring arms 33 from those ends joined to the outer arms 32. A stop lug 37 is bent out of the bearing 35, in my preferred form, for carrying out the purpose of the stop lugs of the other forms of my device hereinabove described. The arms 32 and 33 of each pair are in inclined position and each arm has an aperture 38 for receiving the rod member 1. In this form of my invention I have shown the apertures 38 of circular shape for receiving rod members of circular cross-sectional shape. The inclined arms of each pair act by the same principle as the pairs of arms of my first form of coupling to grip the rod members by a canting action after the rod members have been extended through the apertures of the arms. The bearing 35 of this form of my invention serves as an additional support for the rod members to that normally provided by the respective pairs of arms 32 and 33.

In Figs. 28 and 29 I have shown a pair of rod members 1—1 coupled together by a seventh form of my spring coupling which comprises a one-piece device having an inclined spring arm 39 at each end maintained in spaced coupled relation by means of a connecting portion 40. A stop means in the form of a lug 41 may be struck up from the portion 40. It is seen that my seventh form of coupling, which is illustrative of a modification which may be made on other forms of my coupling device, is identical with my second form of fastener illustrated in Figs. 6–10 of the drawings, but the rod supporting bearing 12 provided as an integral part of the last-mentioned coupling has been omitted. In order that the rod members 1—1 may be properly coupled together by means of a spring coupling such as that shown in Figs. 28 and 29 having no integral means for maintaining the rod members in proper relative position to be gripped by the inclined arms, it is necessary that some means be provided supporting the arms at points along their lengths for carrying out the desired purpose. Thus, in the installation shown in Fig. 28 the rods 1—1 are supported by means of bearings 42, of which any number may be provided and disposed in any suitable position along the lengths of the rod members for carrying out the desired purpose, but it is understood that any other suitable means could be provided for maintaining the rod members in the aforesaid proper position to be gripped by inclined spring arms of coupling devices such as that illustrated and described.

Thus by my invention I have shown spring couplings of simple construction capable of a variety of uses in connection with the separable coupling together of rod-like members.

Although I have illustrated preferred forms of my invention, I do not wish to be limited thereby because the scope of my invention is best set forth in the following claims.

I claim:

1. A coupling for misaligned shafts comprising a strip constituted of spring metal, said strip having a central portion and a pair of oppositely directed U-shape portions forming outwardly extending continuations of the said central portion, the arms of each U-shape portion being provided with a pair of apertures so positioned that they are aligned when said arms are flexed whereby a shaft end may be seated therein and maintained against displacement by the force exerted against the shaft ends when the flexing force is released.

2. The invention as set forth in the above claim wherein said apertures are of noncircular contour to prevent turning of the coupling member with respect to the shaft ends.

3. A coupling device for securing together two shafts comprising a strip having a central portion, a pair of arms forming continuations of the ends of said central portion, bearing means formed as a part of the device and having openings to receive said shafts, each of said arms having an aperture so positioned that it is aligned with an opening of said bearing means when said arm is flexed whereby a shaft end may be seated in said arm and one of said bearing openings and maintained against displacement by the force exerted against the shaft ends when the flexing force is released.

4. A coupling for securing together two shafts comprising a strip having a central portion, a pair of arms forming outwardly extending continuations of the ends of said central portion, a ring-shaped hollow bearing integral to said central portion and having shaft-receiving openings at opposed ends, each of said arms having an aperture so positioned that it is aligned with an opening of said bearing means when said arm is flexed whereby a shaft end may be seated in said arm and one of said bearing openings and maintained against displacement by the force exerted against the shaft ends when the flexing force is released.

5. A coupling for securing together two shafts comprising a strip having a central portion, a pair of arms forming outwardly extending continuations of the ends of said central portion, a ring-shaped hollow bearing integral to said central portion and having shaft-receiving openings at opposed ends, each of said arms having an aperture so positioned that it is aligned with an opening of said bearing when said arm is flexed whereby a shaft end may be seated in said arm and one of said bearing openings and maintained against displacement by the force exerted against the shaft ends when the flexing force is released, and a portion integral to said central portion in alignment with said bearing openings limiting passage of said respective shaft ends through said bearing.

6. A coupling for securing together two shafts comprising a strip having a central portion, a pair of arms forming outwardly extending continuations of the ends of said central portion, bowed portions integrally joined to said central portion and cooperating to form a ring-shaped hollow bearing, said bearing having shaft-receiving openings at opposed ends, each of said arms having an aperture so positioned that it is aligned with an opening of said bearing when said arm is flexed whereby a shaft end may be seated in said arm and one of said bearing openings and maintained against displacement by the force exerted against the shaft ends when the flexing force is released.

7. A coupling for securing together two shafts comprising a strip having a central portion and a pair of oppositely directed U-shaped portions forming outwardly extending continuations of said central portion, the arms of each U-shaped portion being provided with a pair of apertures so positioned that they are aligned when said arms are flexed whereby a shaft end may be seated therein and maintained against displacement by the force exerted against the shaft ends when the flexing force is released.

8. A coupling for securing together two shafts comprising a strip having a central portion and a pair of oppositely directed U-shaped portions forming outwardly extending continuations of said central portion, the arms of each U-shaped portion being provided with a pair of apertures so positioned that they are aligned when said arms are flexed whereby a shaft end may be seated therein and maintained against displacement by the force exerted against the shaft ends when the flexing force is released, and a portion integral to said central portion aligning with the apertures of said arms to limit passage of said respective shaft ends through said U-shaped portions.

HOWARD J. MURPHY.